Jan. 23, 1962     F. F. MILLER     3,017,755

DOUBLE CONSTANT VELOCITY UNIVERSAL JOINT

Filed May 31, 1960

*INVENTOR.*
FRED F. MILLER
BY
*Whittemore, Hulbert & Belknap*
ATTORNEYS

United States Patent Office 3,017,755
Patented Jan. 23, 1962

3,017,755
DOUBLE CONSTANT VELOCITY
UNIVERSAL JOINT
Fred F. Miller, Berkley, Mich., assignor to Dana Corporation, Toledo, Ohio, a corporation of Virginia
Filed May 31, 1960, Ser. No. 32,866
5 Claims. (Cl. 64—21)

This invention relates generally to universal joints, and refers more particularly to double constant velocity universal joints.

One object of the invention is to provide a double constant velocity universal joint which is composed of fewer parts, lighter, more compact, and less expensive to manufacture than prior joints of this type, and yet which is highly efficient in the performance of its intended function.

Another object of the invention is to provide a double constant velocity universal joint in which the outer races of the two joint units are formed from a single member of one-piece construction.

Other objects and advantages of the invention will become apparent from the following description, considered with the accompanying drawing, wherein.

Figure 1:
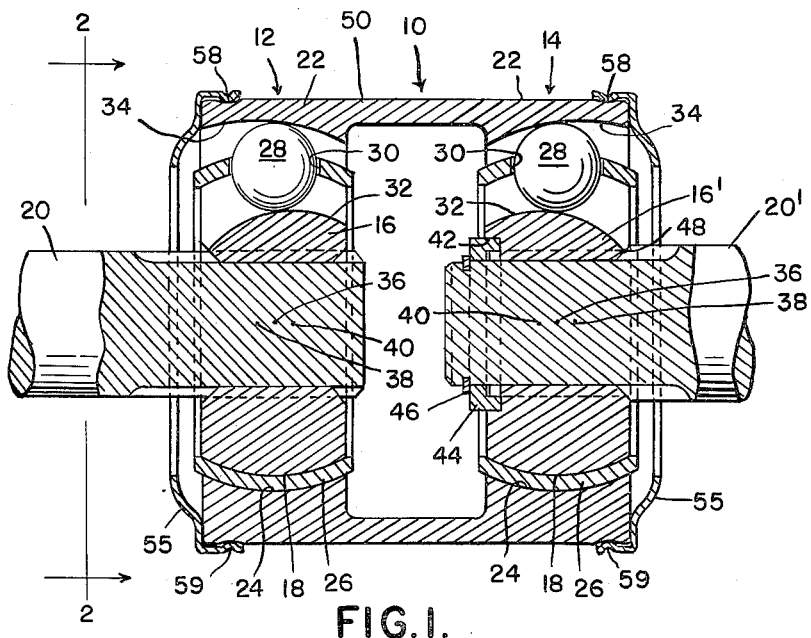
FIG. 1 is a longitudinal sectional view of a double constant velocity universal joint constructed according to my invention.
Figure 2:
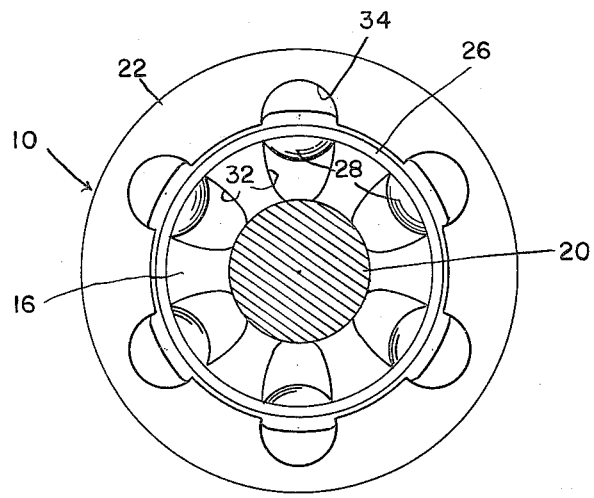
FIG. 2 is an end elevation of the universal joint shown in FIG. 1, with the end cover removed, taken on line 2—2 of FIG. 1.

Referring more particularly to the drawing, the double constant velocity universal joint is indicated generally at 10 and comprises the axially spaced joint units 12 and 14. Considering first the unit 12, the inner spherical race member 16 has an external spherical surface 18 and is internally splined to have a slip connection with a splined shaft 20. The outer spherical race member 22 has an internal spherical surface 24. A spherical cage member 26 is interposed between the members 16 and 22. Balls 28 engage within segmental circumferentially spaced slots 30 in the cage member, and also engage the registering arcuate meridian ball race grooves 32 and 34 in the inner and outer members.

The engaging surfaces of the members 16, 22 and 26 are all concentric with respect to the point 36, which is located at the fixed intersection between the axes of rotation of the members 16 and 22 in any relative angular position of these axes.

The grooves in the outer race member are concentric with the point 38 which lies on the coincident axes of rotation of the members 16 and 22 in the position of alignment of the axes, at one side of the fixed intersection 36. The grooves in the inner race member register with the grooves in the outer race member and are concentric with the point 40 which lies on the coincident axes of rotation of the members 16 and 22 in the position of alignment of the axes, at the opposite side of and spaced an equal distance from the fixed intersection 36.

According to this construction of universal joint, the relative speed of rotation of the inner and outer races remains always the same in any position of angular adjustment between the axes of rotation thereof. Hence the joint transmits constant velocity as is well known in the art.

The joint unit 14 is practically identical to the unit 12 and therefore corresponding reference numerals have been employed. The unit 14 differs only in the connection between the inner race member 16' and the splined shaft 20'. The inner race member has an annular recess 42 formed as a counterbore in its splined internal surface at the inner end of the member, and a retainer washer or adapter ring 44 is held in the recess with a press fit. The end of shaft 20' is reduced to extend through the ring 44 and a transversely split snap ring 46 in a groove in the reduced end of the shaft bears against the inner end of the ring. The shaft has an annular shoulder 48 engaging a similar shoulder on the outer end of the inner race member. The snap ring 46 and shoulder 48 of the shaft hold it against axial movement. The other shaft 20 is free to move axially with respect to the associated inner race member.

The joint units 12 and 14 are axially aligned, that is in the position of alignment of the axes of each joint unit, the coincident axes of one are aligned with the coincident axes of the other, as illustrated.

It will be seen that the outer race members of the two joint units constitute integral portions of a single member of one-piece construction. Specifically the one-piece member, designated 50, is made from a length of tubing and internally machined to form the spherical surfaces of the races. After machining, the outer races are accurately ground and the grooves are ground in the races. The fact that the outer races are formed in a single piece of stock makes handling and manufacturing procedures much simpler in that several operations can be performed at the same time. The machining to desired shape can be done in one chucking and the spherical outer races can be ground simultaneously. A higher degree of accuracy can also be obtained. Problems of accuracy arise where the outer races are separately formed from separate pieces of stock and then bolted together. Such problems are altogether eliminated where the races are initially part of the same piece of material and bear an established and unalterable relationship to each other. This double constant velocity universal joint is not only much less expensive to make, but also is lighter and more compact than prior devices of this type.

Annular covers 55 are provided for the ends of the joint, the inner diameters of which are large enough to clear the shafts in the extreme angular positions thereof. A shallow annular groove 58 is formed in the tube 50 about each end thereof, and the outer margins of the covers are formed to provide dimples 59 spaced angularly thereabout to snap into the grooves to retain the covers.

What I claim as my invention is:

1. A double constant velocity universal joint comprising axially spaced first and second universal joint units, said first universal joint unit including inner and outer races relatively angularly movable with respect to each other, registering generally axially extending ball race grooves in said races and balls in said grooves for transmitting torque between said races, said second universal joint unit including inner and outer races relatively angularly movable with respect to each other, registering generally axially extending ball race grooves in the races of said second unit and balls in said last-mentioned grooves for transmitting torque between the races of said second unit, said outer races being formed as integral portions of a single rigid tube of one-piece construction to facilitate machining and grinding the internal race surfaces, said outer races being located at the opposite ends of said tube and the grooves thereof formed in the interior surface of said tube, said outer races being spaced apart axially and integrally joined by an annular web portion of said tube.

2. The double constant velocity universal joint defined in claim 1 in which said web is of reduced thickness relative to said outer races.

3. A double constant velocity universal joint comprising axially spaced first and second universal joint units, said first universal joint unit including a first outer race having an inner spherical surface, a first inner race within said outer race having an outer spherical surface concentric with but spaced radially inwardly from the inner spherical surface of said outer race, registering circumferentially spaced generally axially extending ball race grooves in the spherical surfaces of said races, a ball in each pair of registering grooves for transmitting torque between said races, a cage in the space between the spherical surfaces of said races having spherical radially inner and outer surfaces concentric with and engaging the spherical surfaces of said inner and outer races, said cage having slots in register with the respective pairs of registering grooves, said balls being engaged in said cage slots and thereby axially located in said grooves, said second universal joint unit including a second outer race having an inner spherical surface, a second inner race within said second outer race having an outer spherical surface concentric with but spaced radially inwardly from the inner spherical surface of said second outer race, registering circumferentially spaced generally axially extending ball race grooves in the spherical surfaces of the races of said second unit, a ball in each pair of registering grooves in the races of said second unit for transmitting torque therebetween, a second cage in the space between the spherical surfaces of said second races having spherical radially inner and outer surfaces concentric with and engaging the spherical surfaces of said second races, said second cage having slots in register with the respective pairs of registering grooves in said second races, the balls of said second unit being engaged in the slots of said second cage and thereby axially located in the grooves of said second unit, said first and second outer races being formed as integral portions of a single rigid tube of one-piece construction at the opposite ends thereof to facilitate machining and grinding the inner spherical surfaces and ball race grooves thereof in the inside surface of said tube, said first and second outer races being spaced apart axially and integrally joined by an annular web portion of said tube.

4. A double constant velocity universal joint comprising axially spaced first and second universal joint units, said first universal joint unit including a first outer race having an inner spherical surface, a first inner race within said outer race having an outer spherical surface concentric with but spaced radially inwardly from the inner spherical surface of said outer race, registering circumferentially spaced generally axially extending arcuate meridian ball race grooves in the spherical surfaces of said races, a ball in each pair of registering grooves for transmitting torque between the races, a cage in the space between the spherical surfaces of said races having spherical radially inner and outer surfaces concentric with and engaging the spherical surfaces of said inner and outer races, said cage having slots in register with the respective pairs of registering grooves, said balls being engaged in said slots and thereby axially located in said grooves, said second universal joint unit including a second outer race having an inner spherical surface, a second inner race within said outer race having an outer spherical surface concentric with but spaced radially inwardly from the inner spherical surface of said second outer race, registering circumferentially spaced generally axially extending arcuate meridian ball race grooves in the spherical surfaces of said second races, a ball in each pair of registering grooves in the second races for transmitting torque therebetween, a second cage in the space between the spherical surfaces of the second races having spherical radially inner and outer surfaces concentric with and engaging the spherical surfaces of the second races, said second cage having slots in register with the respective pairs of registering grooves in said second races, the balls in the registering grooves of said second races being engaged in the slots of said second cage and thereby axially located in said grooves, said first and second outer races being formed as integral portions of a single straight rigid open-ended tube of one-piece construction at the opposite ends of the tube to facilitate machining and grinding the inner spherical surfaces of said outer races as well as the ball race grooves therein, said outer races being spaced apart axially and integrally joined by an annular web portion of said tube of reduced thickness relative to said outer races.

5. The double constant velocity universal joint defined in claim 4 having drive and driven shafts for the inner races of said joints, an axially slidable connection between one of the shafts and the associated inner race and a non-sliding connection between the other of said shafts and associated inner race preventing relative axial movement therebetween.

References Cited in the file of this patent

UNITED STATES PATENTS

| 2,453,964 | Betz | Nov. 16, 1948 |
| 2,574,226 | Sampson | Nov. 6, 1951 |
| 2,875,600 | Miller | Mar. 3, 1959 |

FOREIGN PATENTS

| 377,761 | Great Britain | Aug. 4, 1932 |